United States Patent [19]

Statz

[11] Patent Number: 4,690,981
[45] Date of Patent: Sep. 1, 1987

[54] IONOMERS HAVING IMPROVED LOW TEMPERATURE PROPERTIES

[75] Inventor: Robert J. Statz, Kennett Square, Pa.

[73] Assignee: E. I. Du Pont de Nemours and Company, Wilmington, Del.

[21] Appl. No.: 591,485

[22] Filed: Mar. 20, 1984

Related U.S. Application Data

[63] Continuation-in-part of Ser. No. 477,512, Mar. 21, 1983, abandoned, which is a continuation-in-part of Ser. No. 453,951, Dec. 28, 1982, abandoned.

[51] Int. Cl.⁴ .............................................. C08F 22/00
[52] U.S. Cl. ............................. 525/329.6; 525/330.2; 525/221
[58] Field of Search ................... 525/221, 330.2, 329.6

[56] References Cited

U.S. PATENT DOCUMENTS

| | | | |
|---|---|---|---|
| 3,264,272 | 8/1966 | Rees | 428/461 |
| 3,454,280 | 7/1969 | Harrison et al. | 273/218 |
| 4,173,345 | 11/1979 | Pocklington | 273/233 |
| 4,174,358 | 11/1979 | Epstein | 525/184 |
| 4,299,744 | 11/1981 | Stewart | 525/183 |
| 4,346,194 | 8/1982 | Roura | 525/183 |

*Primary Examiner*—John C. Bleutge
*Assistant Examiner*—A. Carrillo

[57] ABSTRACT

Ionomers of ethylene, unsaturated carboxylic acid and softening comonomer, e.g. alkyl acrylate and/or alkyl vinyl ether having improved low temperature properties are obtained by direct or graft copolymerization at a temperature of from about 100° to about 200° C., followed by neutralization of the carboxylic acid groups with metal ions, such ionomers being characterized by a low level of chain branching of up to about 5.5 chain branches/1000 backbone methylene units.

5 Claims, No Drawings

IONOMERS HAVING IMPROVED LOW TEMPERATURE PROPERTIES

CROSS REFERENCE TO RELATED APPLICATION

This application is a continuation-in-part of copending application Ser. No. 477,512 filed Mar. 21, 1983, now abandoned which is a continuation-in-part of copending application Ser. No. 453,951, filed Dec. 28, 1982, now abandoned.

BACKGROUND OF THE INVENTION

1. Field of the Invention

This invention relates to ionomers and more particularly it relates to ionomers having a low level of chain branching.

2. Description of the Prior Art

Copolymers of ethylene and acrylic or methacrylic acids partially neutralized with metal ions such as sodium or zinc ions (ethylene ionomers) are well-known and are tough molding resin with a combination of good tensile properties and excellent abrasion resistance. Their deficiency is that at low temperatures they become excessively stiff (rigid).

U.S. Pat. No. 3,264,272 discloses ethylene/methacrylic acid/acrylic ester copolymers and ionomers produced from these materials. Polymerization at high pressures of 50 to 3000 atmospheres and elevated temperatures of 150 to 300° C. in the presence of a free-radical polymerization initiator is disclosed.

German OLS No. 2341462 discloses copolymers and ionomers of (a) α-olefins of the formula R—C=CH$_2$ where R is a radical selected from hydrogen and alkyl radicals of 1 to 8 carbon atoms; (b) $\alpha,\beta$-ethylenically unsaturated carboxylic acids of 3 to 8 carbon atoms, and (c) alkyl esters of $\alpha,\beta$-ethylenically unsaturated carboxylic acids of 3 to 8 carbon atoms where the alkyl radical has at least 4 carbon atoms. The reference discloses polymerization temperatures of from 150° to 300° C. The polymers obtained by the reference are disclosed to have improved oxygen permeability. The disclosure is very broad in that olefins containing up to 8 carbon atoms are encompassed, alkyl esters where the alkyl radical has at least 4 carbon atoms are encompassed and the reaction temperature is from 150° to 300° C. There is no disclosure of the importance of nor any requirements regarding short chain branching. There is no disclosure of the importance of copolymerizing low $T_g$ acrylates nor any relationship thereof with improved low temperature properties. The most preferred esters are disclosed to be butyl acrylate, isobutyl acrylate, butyl methacrylate, isobutyl methacrylate, tertiary butyl acrylate and tertiary butyl methacrylate. Of these, only butyl acrylate would give low $T_g$ polymers. The only Example in this reference relating to butyl acrylate was carried out at a polymerization temperature of 215° C. and as such the polymer was not produced at sufficiently low temperature and thus would not have the required low level of polyethylene short chain branches. Accordingly, the product would not have the desired combination of excellent low temperature properties and high level of ethylene crystallinity.

SUMMARY OF THE INVENTION

According to the present invention there is provided an ionic copolymer of ethylene, unsaturated carboxylic acid and at least one softening comonomer that is characterized by being copolymerizable with ethylene and forming a homopolymer that has a glass transition temperature of from about −37° C. to about −80° C., said ionic copolymer having improved low temperature properties, wherein the unsaturated carboxylic acid is selected from the group consisting of acrylic acid, methacrylic acid, maleic acid, fumaric acid, itaconic acid, and half esters of maleic, fumaric and itaconic acids, said copolymer containing from about 10 to about 87% by weight of ethylene, from about 3 to about 30% by weight of unsaturated acid and from about 10 to about 60% by weight of said softening comonomer, said copolymer having from about 3 to about 90% of the carboxylic acid groups ionized by neutralization with metal ion selected from groups Ia, Ib, IIa, IIb, IIIa, IVa, VIb and VIII of the Periodic Table of Elements, said copolymer being characterized by a low level of chain branching of up to about 5.5 chain branches/1000 backbone methylene units.

Further according to the present invention there is provided an improved process of preparing ionic copolymers having improved low temperature properties, said process being selected from the group consisting of direct copolymerization and graft copolymerization wherein (A) said direct copolymerization comprises polymerizing ethylene, unsaturated carboxylic acid and at least one comonomer in the presence of free radical polymerization initiator at elevated temperatures followed by neutralization of the carboxylic acid groups of the resultant direct copolymer with metal ions, and (B) said graft copolymerization comprises polymerizing ethylene and at least one comonomer in the presence of free radical polymerization initiator at elevated temperatures and grafting unsaturated carboxylic acid or anhydride onto the ethylene/comonomer polymer backbone followed by neutralization of the carboxylic acid groups of the resultant graft copolymer with metal ions, the improvement comprising selecting said comonomer from the group consisting of softening comonomers that are characterized by being copolymerizable with ethylene and forming a homopolymer that has a glass transition temperature of from about −37° C. to about −80° C., and selecting the unsaturated acid from the group consisting of acrylic acid, methacrylic acid, maleic acid, fumaric acid, itaconic acid and half esters of maleic, fumaric and itaconic acid, said copolymer containing from about 10 to about 87% by weight of ethylene, from about 3 to about 30% by weight of acid, and from about 10 to about 60% by weight of softening comonomer, the polymerization temperature being from about 100° to about 200° C., from about 3 to about 90% of the carboxylic acid groups of the copolymer being neutralized with metal ions selected from groups Ia, Ib, IIa, IIb, IIIa, IVa, VIb and VIII of the Periodic Table.

DETAILED DESCRIPTION OF THE INVENTION

Surprisingly it was found that certain ionomers derived from ethylene, a softening comonomer and methacrylic acid had improved low temperature properties. These polymers produced at low reactor temperatures, having reduced levels of chain branching, and containing the proper softening comonomer gave ionomers which do not get as stiff at low temperatures and had greatly improved flex crack resistance (Ross Flex) when compared to ionomers produced at high reactor temperatures containing softening comonomers which do not give low glass transition homopolymers.

Accordingly, they are useful as injection-molded items such as ski boots and ice skate shells, and as coatings for fabrics. Additionally, since the ionomers of this invention have superior low temperature properties and lower hardness compared to commercially available ionomers, they could perform as a replacement for balata (balata is trans-1,4-polyisoprene) in golf ball covers. Accordingly, golf balls comprising a core and a cover, wherein the cover comprises the ionic copolymer of the present invention would have similar click and feel as a golf ball made with balata cover. The ionomers of the present invention, can also be used as modifiers for other thermoplastics where they function very efficiently as tougheners.

The polymer of the present invention should be a copolymer of ethylene, unsaturated carboxylic acid and at least one softening copolymer that is copolymerizable with ethylene and gives a homopolymer having low glass transition temperature, said copolymer being partially neutralized with a metal ion.

The unsaturated acid can be selected from the group consisting of acrylic acid, methacrylic acid, maleic acid, fumaric acid and itaconic acid, and the half esters of maleic, fumaric and itaconic acid. The preferred acids are methacrylic acid and acrylic acid.

The softening comonomer can be an alkyl acrylate selected from the group consisting of n-propyl-, n-butyl-, n-octyl-, 2-ethylhexyl-, and 2-methoxyethyl-acrylates. The preferred alkyl acrylates are n-butyl-, 2-ethylhexyl-, and 2-methoxyethyl-acrylates.

The softening comonomer can also be an alkyl vinyl ether selected from the group consisting of n-butyl-, n-hexyl-, 2-ethylhexyl-, and 2-methoxyethyl-vinyl ether. The preferred alkyl vinyl ethers are n-butyl vinyl ether and n-hexyl vinyl ether.

Softening comonomers that are characterized by being copolymerizable with ethylene and forming homopolymers having a glass transition temperature of from about $-37°$ C. to about $-80°$ C. are suitable in the present invention. They can be used either in place of or in addition to the softening comonomers mentioned above. They can be selected from "The Glass Transition Temperature of Polymers" section of the *Polymer Handbook, Second Edition* J. Brandrup & E. H. Immergut, etc., J. Wiley and Sons, New York. 1975, the disclosure of which is hereby incorporated by reference. Accordingly, such softening comonomers encompass e.g., acrylates, and vinyl ethers other than the ones specifically mentioned above, and vinyl esters.

The copolymer contains from about 10 to about 87% by weight of ethylene, from about 3 to about 30% by weight of unsaturated carboxylic acid, and from about 10 to about 60% by weight of softening comonomer. Preferably the copolymer contains from about 60 to about 75% by weight of ethylene, from about 5 to about 15% by weight of unsaturated carboxylic acid and from about 10 to about 30% by weight of softening comonomer.

The copolymer of the present invention has from about 3 to about 90% of the carboxylic acid groups ionized by neutralization with metal ions selected from groups Ia, Ib, IIa, IIb, IIIa, IVa, VIb and VIII of the Periodic Table of the Elements, such as sodium, potassium, zinc, calcium, magnesium, lithium, aluminum, nickel, and chromium. Preferably the copolymer has from about 35 to about 75% of the carboxylic acid groups ionized by neutralization with metal ions selected from the group consisting of sodium, potassium, zinc, calcium and magnesium.

The ionic copolymers of the present invention can be prepared by direct or graft copolymerization. The direct copolymerization process comprises polymerizing ethylene, unsaturated carboxylic acid and softening comonomer in the presence of free radical polymerization initiator at elevated temperatures of from about 100 to about 200° C., preferably from about 140° to about 160° C. or from about 130° to about 145° C. at high pressures, e.g., at least about 140 MPa (20,000 psi) preferably from about 140 MPa (20,000 psi) to about 350 MPa (50,000 psi) followed by neutralization of the carboxylic acid groups of the resultant direct copolymer with metal ions. A suitable polymerization process is discussed in detail in U.S. Pat. No. 3,264,272 (except for the unexpected advantages obtained by employing the lowest possible reactor temperatures), the disclosure of which patent is hereby incorporated by reference.

The graft copolymerization process can be carried out by polymerizing ethylene and softening copolymer in the presence of free radical polymerization initiator at elevated temperatures of from about 100° to about 200° C., preferably from about 140° to about 160° C. and from about 130° to about 145° C., at high pressures e.g., at least about 140 MPa (20,000 psi), preferably from about 140 MPa (20,000 psi) to about 350 MPa (50,000 psi), and grafting unsaturated carboxylic acid or anhydride onto the ethylene/softening comonomer polymer backbone followed by neutralization of the carboxylic acid groups of the resultant graft copolymer with metal ions.

The ionomers of the present invention can be blended with other materials such as nylon, polypropylene, propylene-ethylene copolymers, linear polyethylene, and ethylene/unsaturated carboxylic acid copolymers. These blends will generally find use as toughened thermoplastics.

The ionomers of the present invention containing the monomers specified above and obtained at the low reaction temperatures specified above are characterized by a lower level of chain branching, i.e., up to about 5.5 chain branches/1000 backbone methylene units as determined by C-13 NMR.

The following examples serve to illustrate the present invention. All parts, percentages and proportions are by weight unless otherwise indicated.

COMPARATIVE EXAMPLE 1 AND EXAMPLE 1

The polymer of Comparative Example 1, containing normal butyl acrylate, ethylene and methacrylic acid, was produced by a free radical polymerization carried out at a reactor temperature of 220° C. and 190 MPa (27,000 psi). Monomer addition was adjusted to give a polymer containing 10.1% of methacrylic acid (MAA), 17% of n-butyl acrylate (nBA) and 72.9% of ethylene.

The polymer (base resin) was converted to sodium ionomer by reacting it with a concentrate containing sodium carbonate. Hence 1000 g of the copolymer was reacted with 72 g of a concentrate (containing 50% $Na_2CO_3 \cdot H_2O$ in an ethylene/methacrylic acid copolymer containing 11% MAA and having a melt flow of 100 g/10 min.). The reaction was carried out in a twin screw extruder using the following conditions:

| EXTRUSION CONDITIONS | | | | | | | |
|---|---|---|---|---|---|---|---|
| Screw Speed RPM | Temperatures, °C., Zones | | | | | Rate lbs/hr. | Vacuum in. Hg | H$_2$O Feed cc/hr. |
| | 1 | 2 | 3 | 4 | 5 | | | |
| 50 | 135 | 236 | 247 | 262 | 280 | 5 | 30 | 20 |

The polymer of Example 1 was synthesized at 140° C. and 190 MPa (27,000 psi). Comonomer addition was adjusted to give a composition similar to the composition of the polymer of Comparative Example 1.

The polymer was converted to ionomer using an extrusion procedure similar to the one used in Comparative Example 1. However in this case 2.27 Kg of polymer was mixed with 147 g of zinc oxide concentrate (30% ZnO, 1.5% zinc acetate in E/10 MAA copolymer). Comparison of the results for the polymers of Comparative Example 1 and Example 1 indicate that the polymer made at 220° C. had a higher increase in flexural modulus at lower temperatures and much poorer flex crack resistance (Ross Flex) at −20° C. Compositions and properties are summarized in Table 1.

C-13 NMR analysis was also carried out on the ethylene/n-butyl acrylate/methacrylic acid copolymers of Comparative Example 1 and Example 1 before their conversion to ionomers. The data obtained demonstrated that the use of low reactor temperatures (140° C.) have reduced by almost half the amount of alkyl branches per 1000 backbone methylene units in the copolymer as compared to a copolymer produced at a high reactor temperature of 220° C. (cf. chain branching Table below).

The data in Table I would lead one to conclude that removing short-chain branches and replacing them with lower $T_g$ acrylate or vinyl ether branches improvements in low temperature properties could be achieved.

Any one of the softening comonomers listed in Table IA, or any combination thereof, should give improved low temperature properties when used to replace any of the comonomers listed in Table IB.

CHAIN BRANCHING TABLE

| Example | MAA % | nBA % | Reactor Temp. °C. | No. of Butyl or Larger Alkyl Branches Per 1000 Backbone Methylene Units |
|---|---|---|---|---|
| C-1 | 10.1 | 17.0 | 220 | 8.0 |
| 1 | 8.5 | 17.0 | 140 | 2.5 |

TABLE 1

| | Composition | | | MI$^{(1)}$ | MI$^{(1)}$ | Ion | Ross Flex$^{(2)}$ at −20° C. | Flexural Modulus$^{(3)}$ | | | | Reactor | MP/ |
|---|---|---|---|---|---|---|---|---|---|---|---|---|---|
| | MAA | nBA | iBA | | | | Cycles to | KPa | | (Kpsi) | | | |
| EX. | % | % | % | Base Resin | Ionomer | Type | Fail | 23° C. | 0° | −20°C. | −30° C. | Temp. °C. | FP$^{(4)}$ |
| C-1 | 10.1 | 17.0 | — | 45 | 2.3 | Na | <50 | 48.3 (7.0) | 85.5 (12.4) | 252 (36.6) | 344 (49.9) | 220 | 75/44 |
| 1 | 8.5 | 17.0 | — | 19 | 2.9 | Zn | 800 | 54.12 (7.85) | 92.8 (13.46) | 159 (23.0) | 268 (38.8) | 140 | 81/56 |
| 2 | 8.6 | 24.0 | — | 19 | 2.8 | Zn | 325 | 24.8 (3.6) | 35.4 (5.14) | 78.6 (11.4) | 132 (19.2) | 195 | 70/41 |
| 3 | 9.4 | 22.4 | — | 18 | 1.1 | Zn | 1700 | 21.8 (3.16) | 31.6 (4.58) | 80.7 (11.7) | 94.5 (13.7) | 140 | 68/40 |
| C-2 | 9.9 | — | 19.8 | 25 | 1.4 | Na | <50 | 47.6 (6.90) | 134.6 (19.5) | 340 (49.3) | | 140 | 72/37 |
| C-3 | 9.9 | — | 19.8 | 25 | 5.0 | Zn | <50 | 28.3 (4.10) | 133 (19.3) | 277 (40.3) | | 140 | 73/47 |

FOOTNOTES
$^{(1)}$MI, melt index was determined by ASTM D-1238, Condition E
$^{(2)}$Ross Flex was determined by ASTM D-1052
$^{(3)}$Flexural Modulus was determined by ASTM D-790
$^{(4)}$MP/FP represents melting and freezing point as determined by Differential Scanning Calorimeter (DSC) using a Du Pont 990 Thermal Analyzer.

TABLE IA

| | $T_g$ of homopolymers, °C. |
|---|---|
| n-propyl acrylate | −37 |
| n-butyl acrylate | −54 |
| 2-methoxyethyl acrylate | −50 |
| n-hexyl acrylate | −57 |
| 2-ethylhexyl acrylate | −50 |
| n-butyl vinyl ether | −55 |
| n-hexyl vinyl ether | −74 |
| n-propyl vinyl ether | −66 |

TABLE IB

| | $T_g$ of homopolymers, °C. |
|---|---|
| ethyl acrylate | −24 |
| isobutyl acrylate | −24 |
| methyl vinyl ether | −31 |
| polyethylene short-chain branches | −21 |

EXAMPLES 2 AND 3

The polymer of Example 2 was produced at 190 MPa (27,000 psi) and 195° C. with a composition containing 8.6% of MAA, 24% of nBA, and 67.4% of ethylene. This polymer was subsequently converted to zinc ionomer by reacting it with zinc acetate on a two roll mill. Hence 100 g of polymer was reacted with 6.6 grams of Zn(OAc)$_2$·2H$_2$O in 25 cc of H$_2$O at 200° C. The final ionomer had a MI of 2.8.

The polymer of Example 3 was produced in a manner similar to those of Comparative Example 1 and Examples 1 and 2. However, the reaction was run at 140° C. and an attempt was made to match the composition of Example 2. Hence, a polymer containing 9.4% of MAA, 22.4% of nBA and 68.2% of ethylene was produced and converted to ionomer.

Conversion to ionomer was achieved by reacting 1 Kg of polymer with 60 g of Zn(OAc)$_2$·2H$_2$O dissolved in 150 cc of H$_2$O on a 6 inch-2 roll mill at 190°–200° C. The resulting ionomer was molded and evaluated for physical properties.

The results of the evaluation on the ionomer of Example 3 indicated that it had a lower flexural modulus than that of Example 2 and had significantly improved Ross flex durability at −20° C. Compositions and properties are summarized in Table I.

COMPARATIVE EXAMPLES 2 AND 3

These polymers were produced at 140° C. and 190 MPa (27,000 psi) and contained 70.3% of ethylene, 19.8% of isobutyl acrylate (iBA), and 9.9% of methacrylic acid and were converted to ionomers. The flexural modulus and Ross flex of these ionomers demonstrate that n-butyl acrylate polymers are superior to isobutyl acrylate polymers. Homopolymers of iBA have a relatively high glass transition temperature. Compositions and properties are summarized in Table I.

Comparative Examples 2-3 also demonstrate that there is little or no difference between sodium and zinc ionomers. Hence, the improved flex crack resistance and the reduced low temperature stiffness are attributable not to the ion type but to the softening comonomer and the degree of chain branching.

EXAMPLE 4

A blend of 66-Nylon (Zytel ® 101, E. I. du Pont de Nemours and Company) was produced containing 30% of a zinc ionomer made by neutralizing a copolymer of the following composition: E/28.0 nBA/ 10.1 MAA. The melt blend was produced on a twin screw extruder using a high shear screw design and a melt temperature of 270° C. The resulting polymer blend was injection molded into tensile and flexural modulus bars using standard nylon molding conditions. Results of physical tests on these molded samples are summarized in the Table below:

| Tensile Strength[1] at break | |
| --- | --- |
| MPa | 47 |
| (psi) | 6800 |
| Elongation[1], % | 110 |
| Flex Modulus dry as molded | |
| MPa | 1500 |
| (psi) | 222,000 |
| Notched Izod Impact[2] | |
| at 23° C. J/m | 1400 |
| ft-lb/in | 27 |
| at −20° C. J/m | 460 |
| ft-lb/in | 8.6 |

Footnotes
[1]Tensile strength and % elongtion was determined by ASTM-D638
[2]Notched Izod Impact was determined by ASTM-D256

Compared to unmodified 66-Nylon (Zytel ® 101) the data indicate the ability of these ionomers to significantly toughen nylon and to give improved toughness at low temperatures.

EXAMPLE 5 AND COMPARATIVE EXAMPLES 4–6

The polymers used to produce the ionomers summarized in Table II were synthesized in the same manner as the polymers in Example 1. They were converted to ionomers using the same procedure as described in Examples 2 and 3.

The data in Table II show that the increase in flex modulus at 0 to −30° C. is directly related to the type of softening comonomer. Hence, ionomers that contain high T$_g$ softening comonomers increase in stiffness more when the temperature is lowered than those ionomers that contain lower T$_g$ acrylate comonomers.

TABLE II

| | Composition | | MI | MI | Ion | Flexural Modulus | | | | Reactor | Tg of Ester |
| | | | | | | KPa | | (Kpsi) | | | |
| EX. | MAA % | Ester | Base Resin | Ionomer | Type | 23° C. | 0° C. | −20° C. | −30° C. | Temp., °C. | Homopolymer, °C. |
| --- | --- | --- | --- | --- | --- | --- | --- | --- | --- | --- | --- |
| 5 | 9.9 | 8.7% PA | 46 | 2.7 | Na | 145 (21) | 255 (37) | 607 (88) | 869 (126) | 228 | −37 |
| C-4 | 11.3 | 9.8% EA | 48 | 1.2 | Na | 138 (20) | 303 (44) | 834 (121) | 1034 (150) | 225 | −24 |
| C-5 | 10.9 | 13.1% MMA | 42 | 1.37 | Na | 96 (14) | 296 (43) | 1034 (150) | 1192 (173) | 215 | +105 |
| C-6 | 10 | 10% IBA | 35 | 1.4 | Na | 131 (19) | 386 (56) | 854 (124) | 1130 (164) | 225 | −24 |

Footnotes
PA = propyl acrylate
EA = ethyl acrylate
MMA = methyl methacrylate
IBA = isobutyl acrylate

I claim:
1. Ionic copolymer of ethylene, unsaturated carboxylic acid and at least one softening comonomer said ionic copolymer having improved low temperature properties, wherein the unsaturated carboxylic acid is selected from the group consisting of acrylic acid, methacrylic acid, maleic acid, fumaric acid, itaconic acid, and half esters of maleic, fumaric and itaconic acids, and the softening comonomer is selected from the group consisting of n-propyl acrylate, n-butyl acrylate, 2-ethylhexyl acrylate, and 2-methoxyethyl acrylate said copolymer containing from about 10 to about 87% by weight of ethylene, from about 3 to about 30% by weight of unsaturated acid and from about 10 to about 60% by weight of said softening comonomer, said copolymer having from about 3 to about 90% of the carboxylic acid groups ionized by neutralization with metal ion selected from the group consisting of sodium, potassium, zinc, calcium, magnesium, lithium, aluminum, nickel and chromium, said copolymer being characterized by a low level of chain branching of up to about 5.5 chain branches/1000 backbone methylene units, said copolymer being further characterized by having a flex durablity which is improved by a factor of at least about 500% when compared with a polymer of the same composition as said ionic copolymer, but hav- ing about 8.0 short chain branches per 1000 backbone methylene units.

2. The ionic copolymer of claim 1 wherein said softening comonomer is n-butyl acrylate.

3. The ionomer of claim 1 wherein the ionomer is direct copolymer, said unsaturated acid is selected from the group consisting of acrylic acid and methacrylic acid.

4. The ionomer of claim 3 wherein said ethylene is present in an amount of from about 60 to about 75% by weight, said unsaturated acid is present in an amount of from about 5 to about 15% by weight, said softening comonomer is present in an amount of from about 15 to about 25% by weight.

5. The ionomer of claim 4 wherein said copolymer has from about 35 to about 75% of the carboxylic acid groups ionized by neutralization with metal ion selected from the group consisting of sodium, potassium, zinc, calcium and magnesium.

* * * * *